United States Patent [19]
Buard

[11] Patent Number: 5,461,199
[45] Date of Patent: Oct. 24, 1995

[54] TRUNKING ACCESSORY AND TRUNKING EQUIPPED THEREWITH

[75] Inventor: Yvon Buard, Voutre, France

[73] Assignee: Legrand, Limoges, France

[21] Appl. No.: 177,997

[22] Filed: Jan. 6, 1994

[30] Foreign Application Priority Data

Jan. 14, 1993 [FR] France .................................. 93 00288

[51] Int. Cl.⁶ ..................................................... E04B 5/48
[52] U.S. Cl. .......................... 174/101; 174/135; 52/220.5
[58] Field of Search .................................. 174/101, 95, 97, 174/48, 49, 135; 52/220.5, 716.1, 716.2, 716.3, 716.4, 716.5, 716.6, 716.7, 716.8, 717.1, 717.06, 718.01, 287.1

[56] References Cited

U.S. PATENT DOCUMENTS

| 4,502,259 | 3/1985 | Smith | 52/716.7 |
| 4,708,898 | 11/1987 | Gommier et al. | 52/716.8 |
| 4,905,433 | 3/1990 | Miller | 174/48 |

FOREIGN PATENT DOCUMENTS

| 2062868 | 9/1992 | Canada | 174/48 |
| 2383539 | 10/1978 | France . | |
| 2109614 | 9/1972 | Germany . | |
| 4103708 | 8/1992 | Germany | 174/48 |
| 0452375 | 8/1936 | United Kingdom | 52/716.3 |
| 1536500 | 12/1978 | United Kingdom | 174/97 |

Primary Examiner—Kristine L. Kincaid
Assistant Examiner—H. S. Sough
Attorney, Agent, or Firm—Young & Thompson

[57] ABSTRACT

Having the general form of an extrusion, a trunking accessory has a blade for attaching it to the trunking and a bead adapted to project from the trunking. The accessory can be used with trunking employed to house and protect electrical equipment.

28 Claims, 2 Drawing Sheets

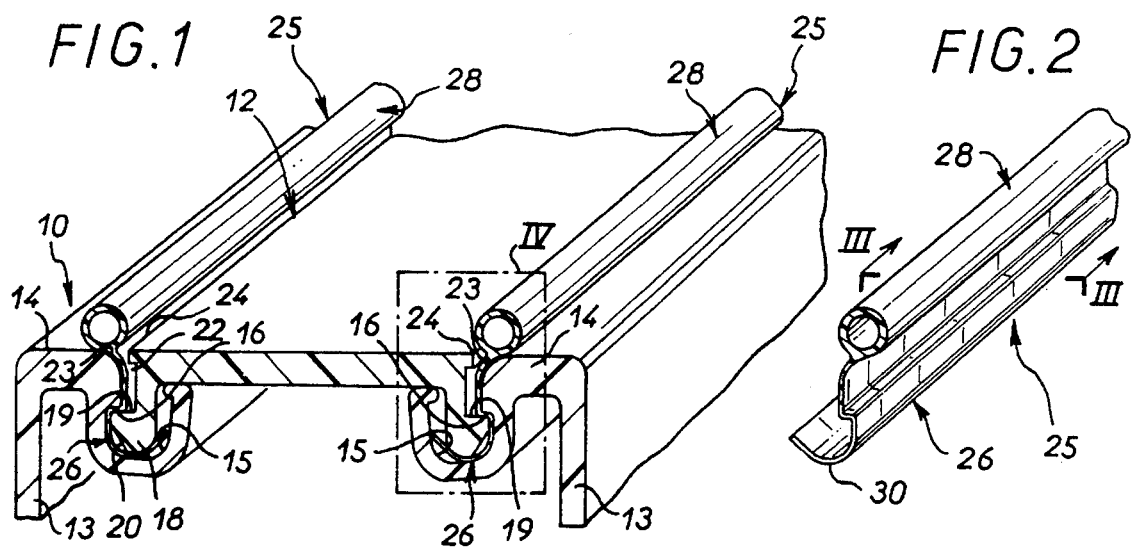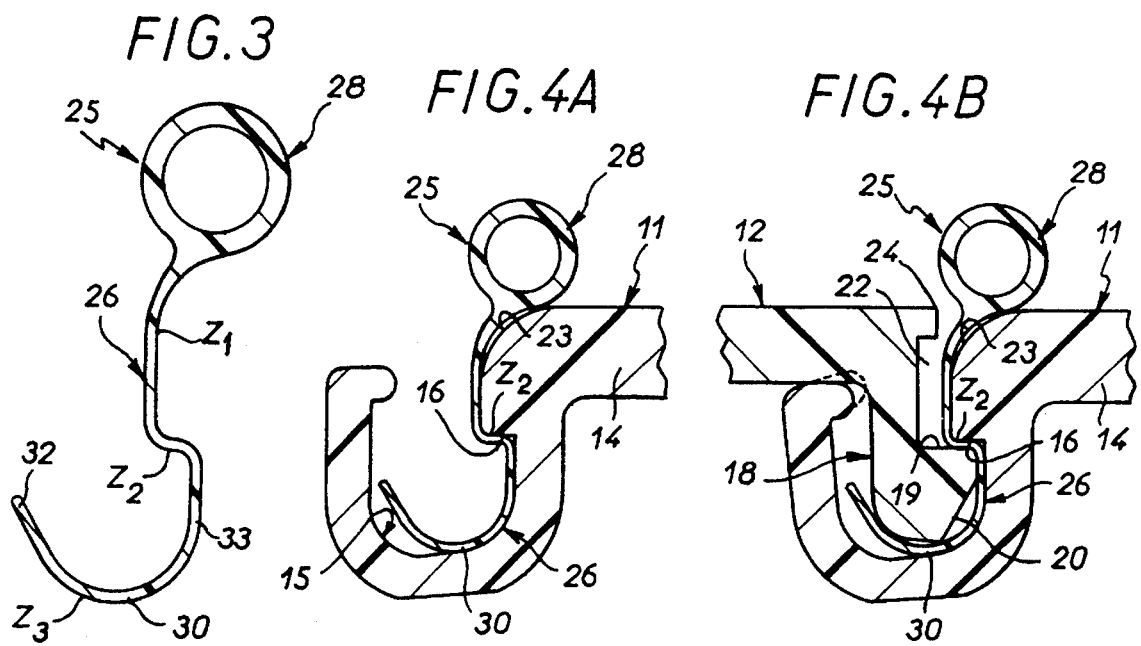

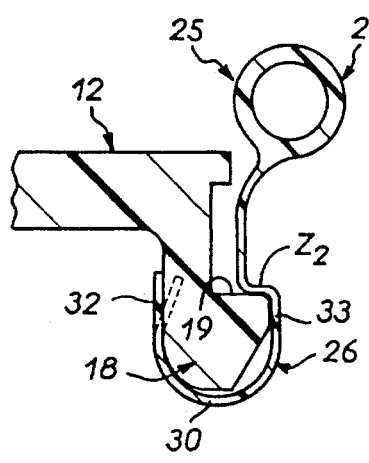
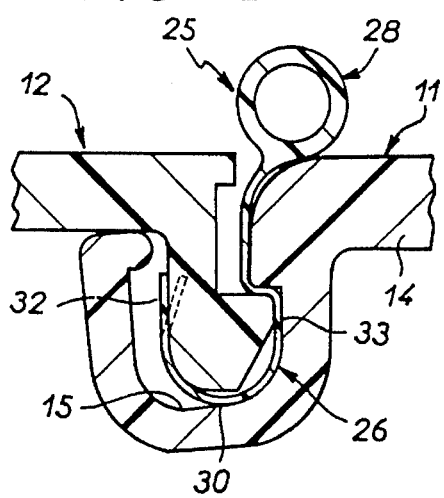
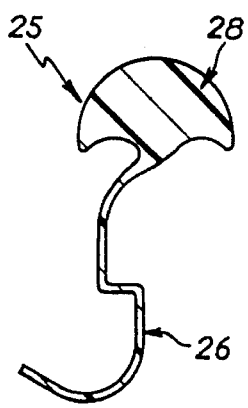
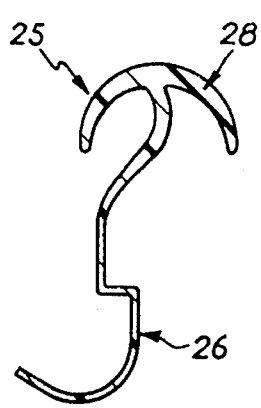
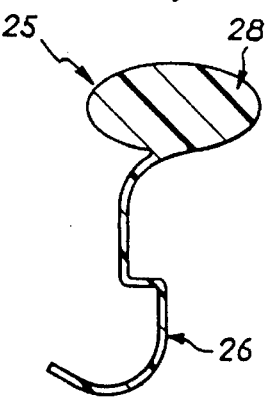
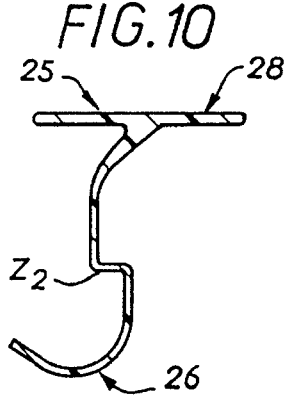
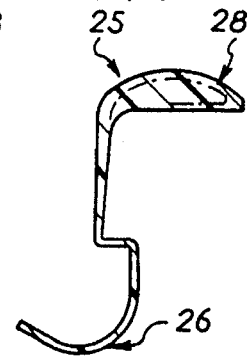
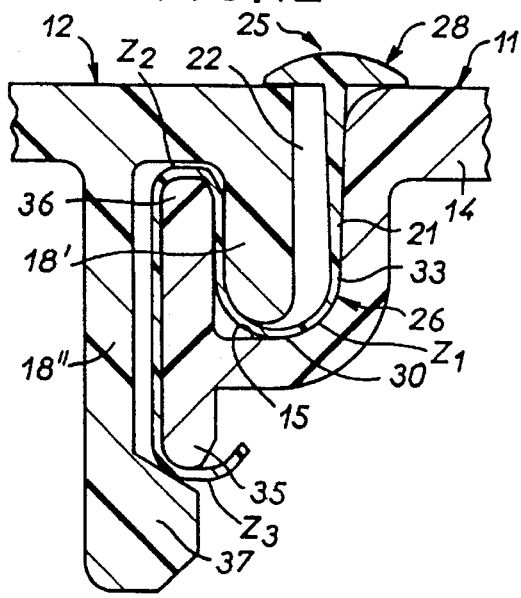
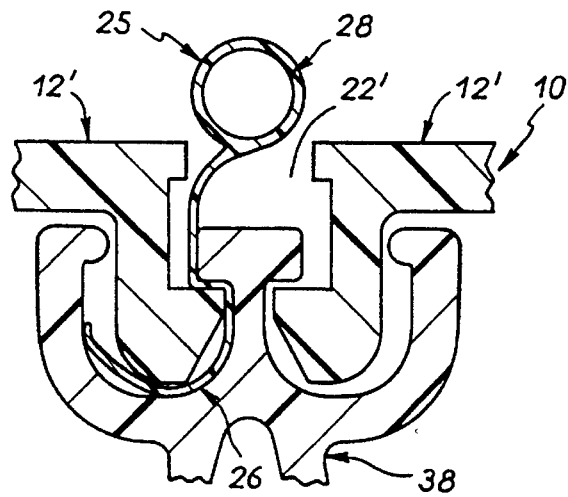

TRUNKING ACCESSORY AND TRUNKING EQUIPPED THEREWITH

BACKGROUND OF THE INVENTION

1. Field of the Invention

The present invention is generally concerned with trunking of the type used to house and protect electrical equipment and conductors connected thereto.

2. Description of the Prior Art

Trunking of this kind comprises a body and a lid in the general form of at least one extrusion and usually two extrusions.

Manufactured by extrusion, trunking of this type is usually of uniform color.

It may be desirable to add color to modify its appearance.

Various arrangements are feasible for this purpose.

Some are a matter for the manufacturer.

The body and/or the lid may be self-colored so that they are different colors.

Alternatively, one or more colored stripes may be painted onto the lid and/or the body. In either case a drawback of the arrangement adopted is that it leads to a costly increase in the number of different product lines or requires manufacture to special order only.

As the choice of color(s) is virtually irreversible, these arrangements lack flexibility and in practise the choice must be made very early on in the works on the site with no possibility of accommodating any change that the user may require in this respect.

Other arrangements are a matter for the user.

The user can apply one or more colored self-adhesive strips to the lid and/or the body, for example.

Apart from the accurate positional control that it requires, this process is difficult because the self-adhesive strip(s) applied in this way are relatively fragile to the extent that they may come unstuck, at least locally, whilst being difficult to remove entirely should such removal be desired.

A general object of the present invention is an arrangement which allows color to be added to trunking as and when required, which does not have the above drawbacks and which has further advantages.

SUMMARY OF THE INVENTION

To be more precise, the invention consists in a trunking accessory comprising a blade for attaching it to the trunking and a bead adapted to project from the trunking. In another aspect it consists in trunking including a body and a lid in the form of at least one extrusion equipped at least locally over at least part of its length with at least one trunking accessory.

The blade of the trunking accessory in accordance with the invention is in practise inserted into the gap which almost inevitably exists between the body and the lid of the trunking.

Initially separate from the trunking, the trunking accessory in accordance with the invention can be made in any color and therefore provides a large number of color combinations between it and the trunking to which it can be fitted, with a minimum number of different product lines.

Alternatively, or additionally, the bead that it incorporates and which is usually the only visible part can advantageously have various configurations which distinguish the aforementioned combinations and therefore increase their number.

In all cases the trunking accessory in accordance with the invention has the advantage of suiting different types of trunking.

It also has the advantage of being demountable so that it can be replaced with another, should this be either desirable or necessary, which makes for great flexibility.

Because it is demountable it is easily recovered and recycled at the end of its useful life.

Apart from its contribution to the decoration of the trunking to which it is fitted the trunking accessory in accordance with the invention is advantageously able to improve its appearance if the gap between its body and its lid is relatively wide.

Projecting from the assembly, the bead on the trunking accessory advantageously covers at least part of this gap, concealing it from view and so re-establishing the required continuity between the body and the lid.

Its blade and/or its bead also advantageously constitute(s) a seal for the assembly, improving the protection of the electrical equipment concerned.

The features and advantages of the invention emerge from the following description given by way of example with reference to the accompanying diagrammatic drawings.

BRIEF DESCRIPTION OF THE DRAWINGS

FIG. 1 is a partial perspective view of trunking equipped with trunking accessories in accordance with the invention.

FIG. 2 is a perspective view of a trunking accessory of this kind shown in isolation, to the same scale as FIG. 1 and in the same manner as the latter.

FIG. 3 is a view of this trunking accessory in transverse cross-section on the line III—III in FIG. 2 and to a larger scale.

FIGS. 4A, 4B are partial transverse cross-section views to different scales showing two successive phases of a first method of fitting the trunking accessory in accordance with the invention, FIG. 4B repeating to a larger scale the part of FIG. 1 identified by a box IV in FIG. 1.

FIGS. 5A, 5B and likewise FIGS. 6A, 6B are partial transverse cross-section views analogous to those of FIGS. 4A, 4B relating to other ways of fitting the trunking accessory in accordance with the invention.

FIGS. 7, 8, 9, 10, 11 are transverse cross-section views analogous to that of FIG. 3 but to a smaller scale and relating to alternative embodiments of the trunking accessory in accordance with the invention.

FIG. 12 is a partial transverse cross-section view analogous to that of FIGS. 4B, 5B and 6B and relating to another type of trunking.

FIG. 13 is a partial transverse cross-section view also analogous to that of FIGS. 4B, 5B and 6B and also relating to another type of trunking.

DETAILED DESCRIPTION OF THE PREFERRED EMBODIMENTS

As shown in the figures, trunking 10 to which the invention may be applied includes, in a manner that is known in itself, a body 11 and a lid 12 in the general form of at least one extrusion.

In the embodiments shown the body 11 and the lid 12 are two separate extrusions.

In addition to a back wall that cannot be seen in the figure, the body 11 has two substantially parallel lateral walls 13 with inwardly facing lips 14 along their free edge with a U-shaped end portion forming a groove 15 whose concave side faces away from the back wall.

FIGS. 1 through 11 and likewise FIG. 13 are more particularly concerned with the situation in which the lid 12 is snap-fastened into the groove 15 in order to attach it to the body 11.

A transverse detent 16 is then provided inside the groove 15 for this purpose.

As shown here, for example, the detent 16 is on that side of the groove 15 which is nearer the respective lateral wall 13.

In this case the lid 12 has a bead 18 projecting from its inside surface along each of its free edges for snap-fastening it into the respective groove 15 on the body 11.

For cooperation with the detent 16 of the groove 15 the bead 18 has a transverse detent 19 in corresponding relationship to the detent 16 on the side facing towards the respective lateral wall 13 of the body 11. On this same side its leading edge is bevelled by means of a chamfer 20 to facilitate its insertion into the groove 15.

There is inevitably a gap 22 between the body 11 and the lid 12 along each bead 18 of the latter.

To facilitate insertion of the bead 18 on the lid 12 into the groove 15 on the body 11 the edge of the lip 14 in which the groove 15 is formed is rounded at 23 with a large radius of curvature which increases the size of the gap 22.

To fill in at least part of this gap 22 the lid 12 has a thinner overhanging extension 24 projecting beyond the bead 18 along each side.

The above arrangements are well known in themselves and as they do not of themselves form any part of the present invention they are not described in further detail here.

According to the invention, the trunking 10 is equipped with at least one trunking accessory 25 of the type described below with reference to FIGS. 1 through 3 at least locally over at least part of its length.

Like the body 11 and the lid 12 of the trunking 10, the trunking accessory 25 is in the general form of an extrusion.

The shape of its transverse cross-section resembles a comma.

It includes a blade 26 for attaching it to the trunking 10 to which it is to be fitted and a bead 28 to form a projection on the trunking 10. In practise these two portions are in one piece.

The blade 26 of the trunking accessory 25 is designed to be inserted into a gap 22 of the trunking 10 and pinched between its body 11 and its lid 12.

The blade 26 is therefore relatively thin.

The blade 26 is the same thickness throughout except where it merges with the bead 28, where it is thickened, its width progressively increasing in the direction towards the bead 28.

In other words, it is the same thickness everywhere in its major part.

The blade 26 has a substantially U-shaped part 30 adapted to extend at least partly around a bead 18 on the lid 12.

The blade 26 has three portions or zones, namely (FIG. 3) a first zone Z1 where it merges with the bead 28 with which it is in one piece, a second zone Z2 substantially perpendicular to the first and forming a shoulder, and a third zone Z3 which forms the U-shape 30 at the end.

The first zone Z1 merges obliquely into the bead 28, with the same profile as a rounded portion 23 of the body 11 of the trunking 10. The second zone Z2 is offset to the same side of the zone Z1 as that to which the zone Z1 is curved obliquely.

The third zone Z3 is substantially perpendicular to the second zone Z2 where it joins onto the latter.

In the embodiments shown in FIGS. 1 through 9 the bead 28 of the trunking accessory 25 in accordance with the invention extends transversely to both sides of the blade 26 where it joins onto the latter.

The bead 28 is a hollow cylinder with a circular contour in transverse cross-section, for example (see FIGS. 1 to 3).

A trunking accessory 25 of this kind may be fitted to trunking 10 as follows, for example.

Initially (FIG. 4A) the U-shape 30 of the blade 26 of the trunking accessory 25 is inserted into one groove 15 of the body 11 with the second zone Z2, i.e. the shoulder, of the blade 26 located under the detent 16 in the groove 15.

The trunking accessory 25 is then held stably onto the body 11 by elastic compression of the U-shape 30 of its blade 26 between the detent 16 in the groove 15 and the bottom of the latter, which has the advantage of enabling manipulation of the assembly without the accessory escaping from the body 11.

By virtue of what has been explained already, and given that the relevant dimensions have been chosen accordingly, the first zone Z1 of the blade 26 of the trunking accessory 25 then mates closely with the rounded portion 23 of the body 11 except that its bead 28 projects in front of the respective lip 14 and is offset slightly towards this lip 14.

Next, (FIG. 4B) the bead 18 on the lid 12 is snap-fastened into the groove 15 on the body 11 of the trunking 10, in the usual way.

It will be readily understood that because it is slightly offset and because it is capable of some elastic deformation the bead 28 on the trunking accessory 25 does not impede this snap-fastening.

On completion of this snap-fastening the zone Z2 of the blade 26 of the trunking accessory 25 is pinched between the detent 16 on the body 11 and the detent 19 of the lid 12, which strengthens its retention to the assembly.

Its bead 28 covers at least part of the respective gap 22 in the trunking 10.

As shown in FIG. 1, the trunking 10 may be equipped with a trunking accessory 25 in each of its gaps 22 over its entire length, either continuously or in sections.

In the embodiment shown in FIGS. 5A and 5B at least the free branch 32 of the U-shape 30 of the blade 26 of the trunking accessory 25 in accordance with the invention is elastically deformable and its elasticity is exploited to strengthen the initial retention of the trunking accessory 25 in the groove 15 on the body 11.

To this end the free branch 32 diverges obliquely from the other branch 33 of the U-shape 30.

It therefore bears elastically against the respective flank of the groove 15 as shown in continuous line in FIG. 5A, in which its unstressed configuration is shown in dashed outline.

Otherwise the arrangements are the same as previously.

In the embodiment shown in FIGS. 6A and 6B the free branch 32 of the U-shape 30 of the blade 26 of the trunking accessory 25 in accordance with the invention converges obliquely towards the other branch 33 of the U-shape 30 and the trunking accessory 25 is initially fitted to the bead 18 on the lid 12 before the latter is snap-fastened into the groove 15 on the body 11 (FIG. 6A).

It is elastically retained on the lid 12 by the bearing engagement of the second zone Z2 of the blade 26 against the detent 19 on the bead 18 and elastic loading of the free branch 33 of the U-shape 30 of the blade 26 in the direction causing this second zone Z2 to remain interengaged with the detent 19.

In the embodiments shown in FIGS. 7 and 8 the bead 28 of the trunking accessory 25 in accordance with the invention has a dome-shape in transverse cross-section and is either solid (FIG. 7) or hollow (FIG. 8).

In the embodiment shown in FIG. 9 it has an oval-shape transverse cross-section and in the embodiment shown in FIG. 10 it has a flat shape in transverse cross-section.

These embodiments are naturally given here by way of example only to illustrate the wide diversity of shapes that the bead 28 of the trunking accessory 25 in accordance with the invention may have.

Many other embodiments are equally feasible.

For example, instead of being smooth the bead 28 of the trunking accessory 25 could be ribbed.

Furthermore, as shown in FIG. 11, the bead 28 could equally well extend transversely on one side only of the blade 26 carrying it.

In this embodiment it is on the same side of the blade 26 as the zone Z2 of the latter forming the shoulder.

In this embodiment the bead 28 is dome-shape, either solid as shown in continuous line or hollow with a lip along its free edge as shown in chain-dotted line.

However, the tubular, oval and flat shapes of FIGS. 1 through 6, 9 and 10 could equally well be used in the case of a unilateral transverse extension of the bead 28 of this kind.

FIG. 12 concerns the situation in which the lid 12 is fastened to the body 11 by being snap-fastened onto the lip 14 forming the groove 15 rather than into the latter.

In this case the lid 12 has projecting from its lower surface a bead 18' with no detent to be inserted in the groove 15 and, parallel to and set back from the bead 18', a second bead 18" which has a detent 37 projecting from it for snap-fastening it to a rib 35 in corresponding relationship to it and extending inwardly the free branch 36 of the part of the body 11 defining the groove 15 on its lip 14.

The blade 26 of the trunking accessory 25 in accordance with the invention is shaped accordingly.

It has in succession, starting from the bead 28, a U-shape first zone Z1 adapted to extend around the bead 18' of the lid 12, a U-shaped second zone Z2 facing in the opposite direction and adapted to extend around the free branch 36 of the body 11 and a U-shape third zone Z3 facing the same way as the first zone Z1 for its interengagement with the rib 35.

The portion of the blade 26 of the trunking accessory 25 immediately adjoining its bead 28 is inserted into the gap 22 between the body 11 and the lid 12 of the trunking 10 to which it is to be fitted.

FIG. 13 shows the application of the invention to the situation in which the body 11 of the trunking 10 to be equipped with the accessory has an intermediate partition 38 inside it, between its lateral walls, and rather than a single lid 12 there are two narrower lids 12' disposed side by side at the same level as the latter with a gap 22' between the lids 12'.

As before, the bead 28 of the trunking accessory 25 in accordance with the invention covers at least part of this gap 22'.

In the embodiment shown the trunking 20 is of the type shown in FIGS. 1 through 11.

It could equally well be of the type shown in FIG. 12, however.

The present invention is not limited to the embodiments and applications described and shown but encompasses any variant execution and/or combination of their various component parts.

Specifically, rather than the trunking accessory in accordance with the invention being attached to the trunking to which it is to be fitted by being pinched between the body and the lid of the latter, or interengaged with a rib on the lid, the attachment could equally well be achieved by any other means, for example by gluing.

The means for snap-fastening the lid to the body may conjointly be different from those specifically described and shown, with the blade of the trunking accessory in accordance with the invention merely adapted accordingly.

Finally, rather than being in the form of two separate extrusions, the body and the lid of the trunking could be parts of a single extrusion, being hinged together along one generatrix of the latter.

There is claimed:

1. A decorative trunking accessory, for trunking of the kind comprising a body and a lid cooperable with the body, the body and lid having complementary snap-fastening components having cooperable transverse detents for forming a snap-fastening connection, a gap being formable between the lid and body when in snap-fastened relation, the decorative trunking accessory insertable between the lid and body and comprising a blade and a decorative bead disposed at an end of the blade, the blade being adapted to extend along an interface between the complementary snap-fastening components and through the gap and having a U-shaped portion adapted to extend along the interface and at least partly around one of said complementary components and the decorative bead being arranged to project beyond the trunking when the trunking accessory is inserted in position between the body and lids, said blade having three zones including a first zone merging into said decorative bead and in one piece construction therewith, a second zone substantially perpendicular to said first zone and forming a shoulder adapted to be received between the detents, and a third zone joined to the second zone and comprising the U-shaped portion.

2. A decorative trunking accessory, for trunking of the kind comprising a body and a lid cooperable with the body, the body and lid having complementary snap-fastening components for forming a snap-fastening connection, a gap being formable between the lid and body when in snap-fastened relation, the decorative trunking accessory insertable between the lid and body and comprising a blade and a decorative bead disposed at an end of the blade, the blade being adapted to extend along an interface between the complementary snap-fastening components and through the gap and having a U-shaped portion adapted to extend along the interface and at least partly around one of said complementary components and the decorative bead being arranged to project beyond the trunking when the trunking accessory is inserted in position between the body and lid, the blade comprising in succession a U-shaped first zone adapted to extend around a bead projecting from the lid, a U-shaped second zone opening in an opposite direction in relation to the U-shaped first zone and adapted to extend around a free branch of the body defining in part a groove, and a U-shaped third zone opening in the same direction as the first U-shaped zone for interengagement with a rib on the lid.

3. A trunking accessory according to claim 1 or 2, for trunking with the complementary snap-fastening components respectively comprising a projecting bead on the lid and a groove on the body, wherein said U-shaped portion is adapted to extend at least partly around the projecting bead and along the interface with the groove.

4. A trunking accessory according to claim 1 or 2, wherein said U-shaped portion has two legs including an elastically deformable leg remote from said decorative bead.

5. A trunking accessory according to claim 4, wherein said elastically deformable leg diverges obliquely from an opposite leg of the U-shaped portion.

6. A trunking accessory according to claim 4, wherein said blade has a rest configuration in which the elastically deformable leg converges obliquely toward an opposite leg of the U-shaped portion.

7. A trunking accessory according to claim 1, wherein said third zone is joined to said second zone substantially at right angles.

8. A trunking accessory according to claim 1, wherein said blade is substantially comma-shaped in transverse cross section.

9. A trunking accessory according to claim 1 or 2, wherein said blade is generally of uniform thickness except in a thickened zone merging into said decorative bead.

10. A trunking accessory according to claim 1 or 2, wherein said decorative bead extends to both sides of the end of said blade.

11. A trunking accessory according to claim 1 or 2, wherein said decorative bead extends transversely to one side only of the end of said blade.

12. A trunking accessory according to claim 1 or 2, wherein said decorative bead is joined to the blade at said end only.

13. Trunking comprising a body and a lid cooperable with the body, the body and lid having complementary snap-fastening components for forming a snap-fastening connection, a gap formable between the lid and body when in snap-fastened relation, and a decorative trunking accessory insertable between the body and lid and through the gap, and comprising a blade and a decorative bead disposed at an end of the blade, the blade having a U-shaped portion adapted to extend at least partly around one of the snap-fastening components along an interface between said snap-fastening components and the decorative bead being arranged to project beyond the lid and the body when the decorative trunking accessory is mounted in position between the body and lid.

14. Trunking according to claim 13, wherein the complementary snap-fastening components respectively comprise a projecting bead on the lid and a groove on the body, said U-shaped portion being adapted to extend at least partly around the projecting bead and along the interface with the groove.

15. Trunking according to claim 13, wherein said U-shaped portion has two legs including an elastically deformable leg remote from said decorative bead.

16. Trunking according to claim 15, wherein said elastically deformable legs diverges obliquely from an opposite leg of the U-shaped portion.

17. Trunking according to claim 15, wherein said blade has a rest configuration in which the elastically deformable leg converges obliquely toward an opposite leg of the U-shaped portion.

18. Trunking according to claim 13, wherein said complementary snap-fastening components have cooperable transverse detents, said blade having three zones including a first zone merging into said decorative bead and in one piece construction therewith, a second zone substantially perpendicular to said first zone and forming a shoulder adapted to be received between the detents, and a third zone joined to the second zone and comprising the U-shaped portion.

19. Trunking according to claim 18, wherein said third zone is joined to said second zone substantially at right angles.

20. Trunking according to claim 13, wherein said blade is substantially comma-shaped in transverse cross section.

21. Trunking according to claim 13, wherein a pair of beads project from the lid and a groove is formed on the body, a first one of the projecting beads being insertable in the groove and a second one of the projecting beads comprising one of the snap-fastening components, the other of the snap-fastening components comprising a rib on the lid, said blade comprising in succession a U-shaped first zone adapted to extend around the first one of the projecting beads, a U-shaped second zone opening in an opposite direction in relation to the U-shaped first zone and adapted to extend around a free branch of the body defining in part the groove, and a U-shaped third zone opening in the same direction as the first U-shaped zone for interengagement with the rib on the body.

22. Trunking according to claim 13, wherein said blade is generally of uniform thickness except in a thickened zone merging into said decorative bead.

23. Trunking according to claim 13, wherein said decorative bead extends to both sides of the end of said blade.

24. A trunking according to claim 13, wherein said decorative bead extends transversely to one side only of the end of said blade.

25. Trunking according to claim 13, wherein said decorative bead is joined to the blade at said end only.

26. Trunking according to claim 13, wherein said decorative bead is arranged to cover the gap at least partly when the decorative trunking accessory is inserted in position between the body and lid.

27. Trunking according to claim 13, wherein at least part of said U-shaped portion of the blade being clampable between said snap-fastening components.

28. Trunking according to claim 13, wherein said U-shaped portion of the blade is at least in part elastically deformable and resiliently retainable in position on one of the complementary snap-fastening components while the complementary components are brought into snap-fastening relation with each other.

* * * * *